(No Model.) 2 Sheets—Sheet 1.
G. LAUBE.
COMBINED STRAW BURNING HEATING AND COOKING STOVE.
No. 389,395. Patented Sept. 11, 1888.
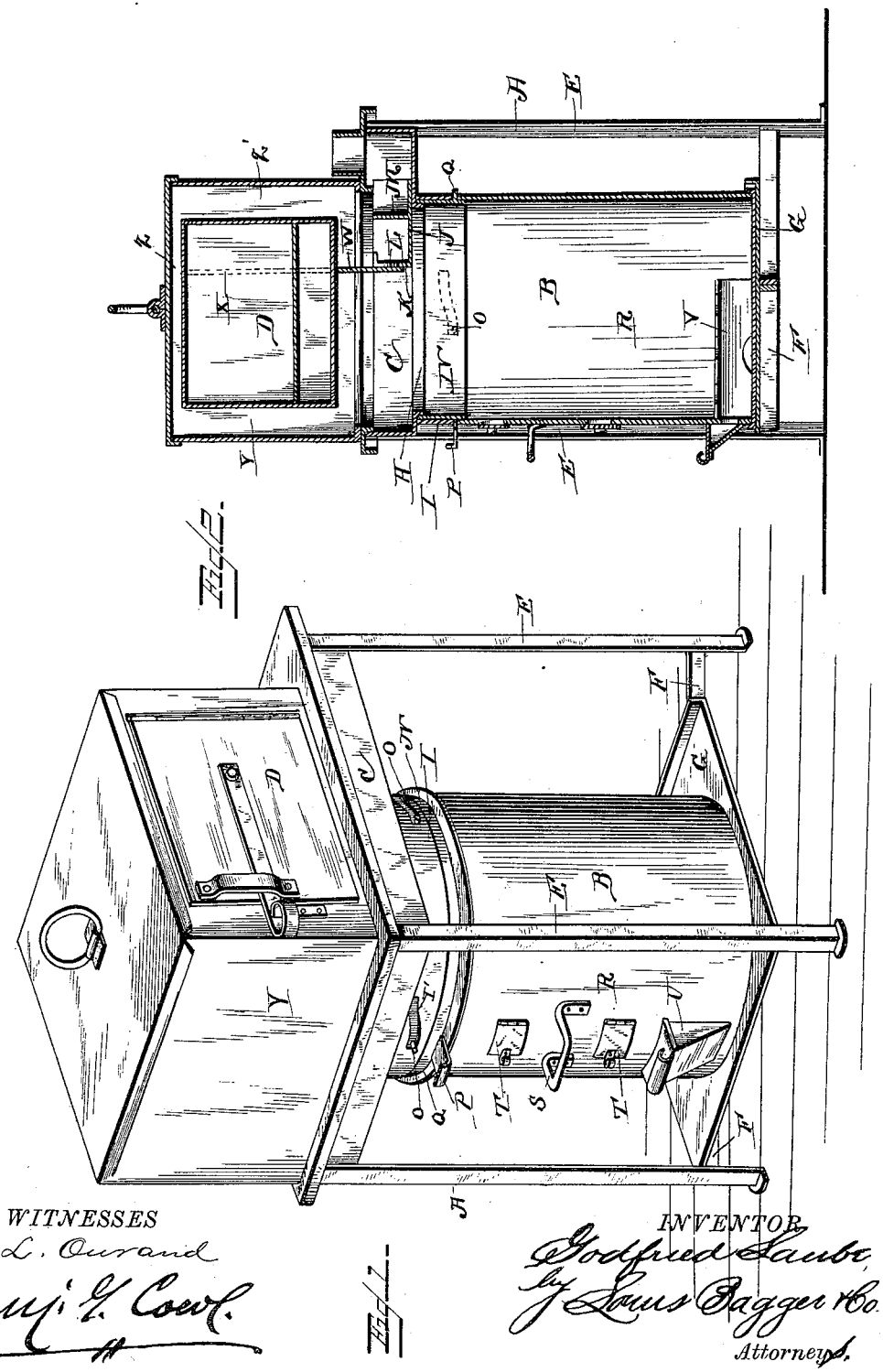
WITNESSES
F. L. Ourand
Benj. T. Cowl
INVENTOR
Godfried Laube
by Louis Bagger & Co.
Attorneys.

(No Model.) 2 Sheets—Sheet 2.

G. LAUBE.
COMBINED STRAW BURNING HEATING AND COOKING STOVE.

No. 389,395. Patented Sept. 11, 1888.

WITNESSES
F. L. Ourand
Benj. J. Cowl

INVENTOR
Godfried Laube,
by James Dagger & Co.,
Attorneys

N. PETERS, Photo-Lithographer, Washington, D. C.

UNITED STATES PATENT OFFICE.

GODFRIED LAUBE, OF HURON, DAKOTA TERRITORY.

COMBINED STRAW-BURNING HEATING AND COOKING STOVE.

SPECIFICATION forming part of Letters Patent No. 389,395, dated September 11, 1888.

Application filed January 30, 1888. Serial No. 262,342. (No model.)

*To all whom it may concern:*

Be it known that I, GODFRIED LAUBE, a citizen of the United States, and a resident of Huron, in the county of Beadle and Territory of Dakota, have invented certain new and useful Improvements in Combined Straw-Burning Heating and Cooking Stoves; and I do hereby declare that the following is a full, clear, and exact description of the invention, which will enable others skilled in the art to which it appertains to make and use the same, reference being had to the accompanying drawings, which form a part of this specification, and in which—

Figure 3:
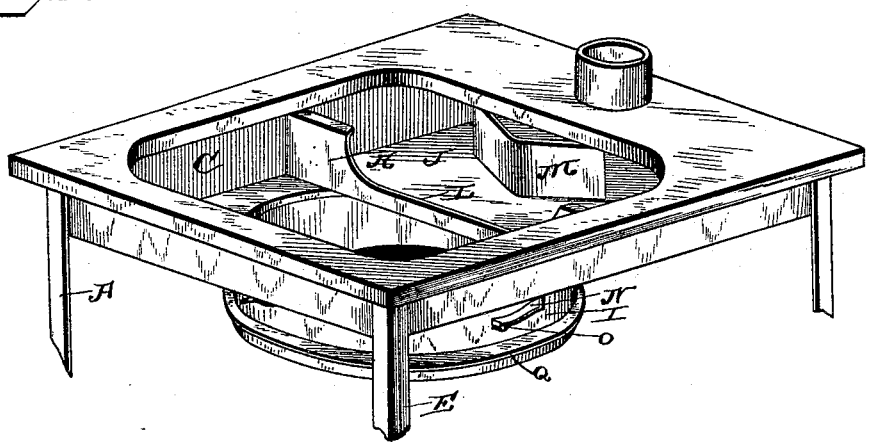
Figure 4:
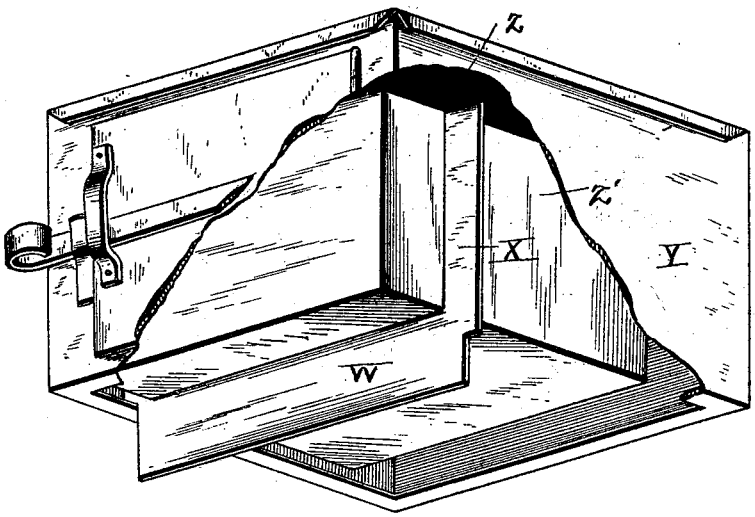

Figure 1 is a perspective view of my improved combined straw-burning heating and cooking stove. Fig. 2 is a vertical sectional view of the same. Fig. 3 is a perspective view of the stove-casing with the oven removed to more clearly illustrate my invention, and Fig. 4 is a bottom perspective view of the oven with a portion of its casing torn away to more clearly show the construction of the same.

Similar letters of reference denote corresponding parts in all the figures.

My invention has relation to combined straw-burning heating and cooking stoves; and it consists in the improved construction and combination of parts of the same, as will be hereinafter more fully set forth.

In the accompanying drawings, the letter A denotes the skeleton frame, upon which the straw-magazine B, the stove-casing C, and the bake-oven D are supported. This frame consists of uprights E, and near their lower ends cross-braces F, upon which is secured the platform G, which supports the straw-magazine. The stove-casing C is provided with a forward draft-opening, H, encircled by a downwardly-projecting annular flange, I, having inclined slots I' in its sides, and is provided at the rear of this draft-opening with a sheet, J, having its upwardly-bent forward edge, K, formed with a curved recess, L. To the rear of this sheet is secured an angular strip, M, the object of which will be hereinafter fully set forth. Secured vertically adjustable in this downwardly-projecting flange I is a collar, N, provided at its intermediate side portions with pins O, which project through the inclined slots of the annular flange I. This collar is provided with a lip, P, and a laterally-projecting flange, Q, near its lower edge.

R denotes the straw-magazine, the peculiar construction of which I make no claim for in this application. This magazine is provided with handles S, by which it may be removed for emptying and refilling doors T, for regulating the draft, and through which the fire may be poked or the fuel lighted; and it is further provided with a draft-cup, U, communicating with the perforated draft-tube V in the interior of the magazine. The oven D is provided on its bottom with a downwardly-extending wing, W, which is formed with an upward extension, X, and is inclosed within a casing, Y, which forms the top and side hot-air chambers, Z and Z', respectively.

The operation of my invention is as follows: After the magazine has been filled with fuel (straw or hay) and placed upon the platform of the stove-frame, and the fuel lighted, the ear upon the annular collar is turned to the left, which forces the edge of the said collar into the magazine and the laterally-projecting flange thereof firmly against the bead upon the upper edge of the magazine, thus preventing the escape of smoke into the room. The products of combustion now escape through the top of the magazine upwardly through the forward air-space of the oven, then over the top thereof down through the rear air-space of the oven, and thence to the rear sides of the said casing and up through the smoke-pipe in the top thereof.

It will be seen that the wing and extension of the oven and the upwardly-bent edge of the sheet J will prevent the products of combustion from escaping directly to the rear of the oven and out through the smoke-pipe of the casing, but cause them to ascend and to freely circulate around the sides and the top of the oven, and then to escape into the casing and up through the smoke-pipe, thus furnishing a powerful heat for cooking within the oven. It will also be seen that the angular strip in the stove-casing prevents the products of combustion from escaping directly up the chimney, but guides them to the rear sides of the casing, whence they escape upward through the chimney, thus furnishing sufficient heat for cooking upon the rear of the stove-casing.

If desired, the oven may be removed and the spider and its lids placed upon the stove-casing, when the stove may be used for frying or boiling eatables, the curved recess in the upwardly-bent portion of the sheet J in this case furnishing a draft-communication with the straw-magazine. Now, when it is desired to remove the magazine for emptying and refilling, the ear upon the annular collar is turned to the right and the collar is raised, it being guided upward by the inclined slots in the annular flange which encircles the draft-opening of the stove-casing, thus permitting the magazine to be removed.

From the foregoing description, taken in connection with the accompanying drawings, the operation and advantages of my invention will be readily understood.

It will be seen that while employed as a cook-stove the magazine, which is not incased, radiates a sufficient amount of heat for warming the room in which it is used. Thus, it will be seen, my invention is effective not only as a cooking-stove, but as a heating-stove also.

Having thus described my invention, I claim and desire to secure by Letters Patent—

1. The combination of a frame, a removable straw-magazine, a stove-casing supported upon said frame and formed with the forward draft-opening, an annular flange encircling said draft-opening, a vertically-adjustable collar secured within said flange, and provided with a laterally-projecting flange adapted to fit the upper end of the said magazine.

2. The combination of a frame, a removable straw-magazine, a stove-casing supported upon said frame and formed with a forward draft-opening, a downwardly-projecting flange encircling said draft-opening and formed with inclined slots, a vertically-adjustable collar secured within said flange, and provided with pins which work in said inclined slots, and with a laterally-projecting flange and ear.

3. The combination of a frame, the removable straw-magazine, the stove-casing supported upon said frame and formed with the forward circular draft-opening, the sheet having the upwardly-bent edge, with a removable oven, the casing surrounding said oven and forming air-chambers, and a downwardly-extending wing.

In testimony that I claim the foregoing as my own I have hereunto affixed my signature in presence of two witnesses.

GODFRIED LAUBE.

Witnesses:
SIMMIE GOMBAR,
HATTIE LAUBE.